(No Model.)
G. J. LEARZAF & F. E. SMITH.
TINNER'S SHEARS.
No. 426,391. Patented Apr. 22, 1890.
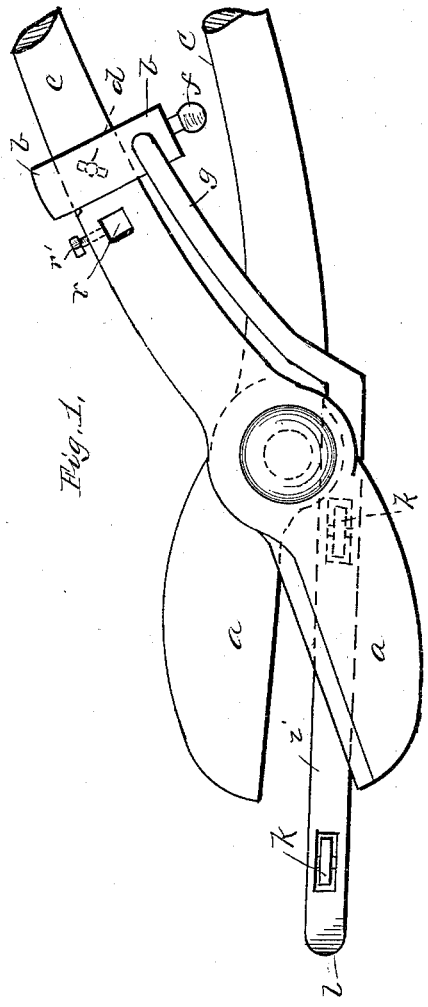
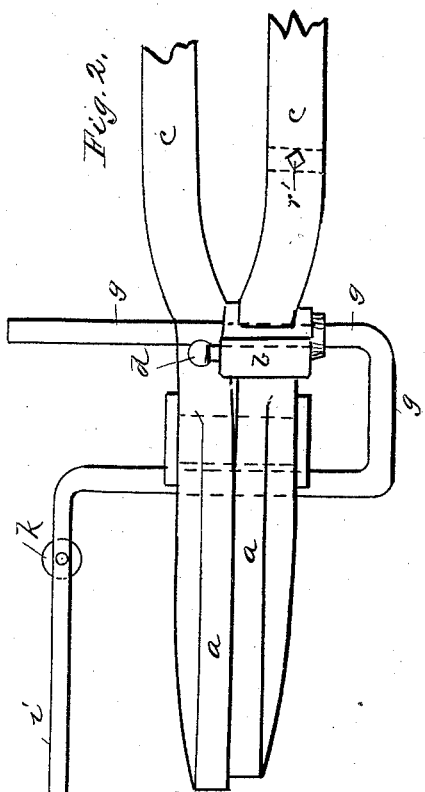
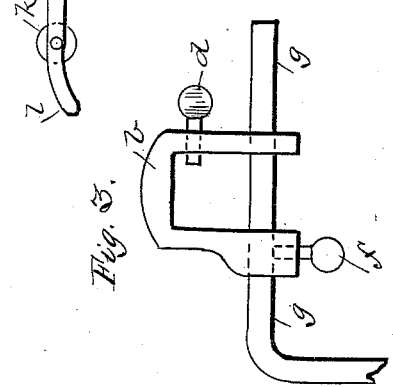
Witnesses:
H. E. Harrison
J. A. Herrow
Inventors:
George J. Learzaf
Frank E. Smith
per O. D. Levis att'y

UNITED STATES PATENT OFFICE.

GEORGE J. LEARZAF AND FRANK E. SMITH, OF PITTSBURG, PENNSYLVANIA.

TINNER'S SHEARS.

SPECIFICATION forming part of Letters Patent No. 426,391, dated April 22, 1890.

Application filed July 13, 1889. Serial No. 317,453. (No model.)

*To all whom it may concern:*

Be it known that we, GEORGE J. LEARZAF and FRANK E. SMITH, citizens of the United States, residing at Pittsburg, in the county of Allegheny and State of Pennsylvania, have invented certain new and useful Improvements in Guides for Tinners' Shears; and we do hereby declare the following to be a full, clear, and exact description of the invention, such as will enable others skilled in the art to which it pertains to make and use the same, reference being had to the accompanying drawings, which form a part of this specification.

Our invention relates to an attachment for tinners' shears, the object being to provide a means whereby the edges about a metallic roof may be evenly trimmed by means of an adjustable guide attached to one of the handles of the shears in such a manner that a portion of the said guide will project beneath the roofing and be guided by the wood forming the same, together with certain other details of construction and combination of parts, as will be fully set forth hereinafter.

In the accompanying drawings, Figure 1 is a side elevation of an ordinary pair of tinner's shears having our improved guide attached thereto. Fig. 2 is a plan view of the same. Fig. 3 is an end elevation of the clamp.

To put our invention into practice with a pair of tinner's shears $a$, such as are now in common use, we provide a clamp $b$, adapted to be placed over one of the handles $c$ of the shears and be rigidly secured thereto by a short thumb-screw $d$. Adjustably attached to this clamp $b$ by means of a set-screw $f$ is a square bar $g$, which by several bends is inclined downward and inward, and a portion $i$, arranged parallel to the cutting-edges of the shears $a$. This portion $i$ of the guide is provided with two small rollers $k$ and its extremity $l$ bent outward to avoid any small obstruction.

In operation this device is secured to one of the handles $c$ of the shears $a$ and the portion $i$ adjusted by means of the thumb-screw $f$ or moved toward or away from the shears $a$ to correspond with the desired length of tin projecting over the roof. The shears $a$ are operated in the same manner as without the attachment. The straight portion $i$, moving along the frame-work beneath the tin and in contact with the same, enables the operator to shear the tin without a line or mark and at the same time keep the edges parallel.

In the handle of one of the blades $c$ of the shears we provide a transverse opening $r$, the function of which is to receive the angular arm $g$ of the guide, and thus enable us to dispense with the use of the clamp. By fitting the arm $g$ in the aperture $r$ and employing the thumb-screw $r'$, which works in a threaded opening in one of the handles, we are enabled to adjustably secure the guide to the shears without the use of the clamp, as is obvious.

Having thus described our invention, what we claim, and desire to secure by Letters Patent, is—

1. In combination with a pair of tinners' shears $a$, the clamp $b$, adapted to be secured to one of the handles $c$ of same by a thumb-screw $d$, the rod $g$, adjustably attached to the said clamp $b$ and bent downward and inwardly, and a portion $i$ of the said rod $g$ arranged parallel with the shear-blades $a$ and provided with one or more rollers $k$, substantially as and for the purpose described.

2. The combination, with a pair of shears, of a clamp fixed to one of the handles of the shears, and a bent guide-rod having one arm thereof secured in the clamp and another arm arranged at one side of the shears and substantially parallel therewith, substantially as and for the purpose described.

3. The combination, with a pair of shears, of a bent guide-rod having an arm $g$ secured adjustably to one handle of the shears, to adapt the guide-rod to be moved laterally of the shears, said rod having another arm $i$, arranged substantially at right angles to the arm $g$ and parallel with the blades of the shears, substantially as and for the purpose described.

4. A guide for tinners' shears, comprising a guide-rod having an arm $g$ and another arm $i$, arranged at right angles to the arm $g$ and provided with a friction-roller, and a clamp for securing the guide-rod to a shears, substantially as and for the purpose described.

In testimony that we claim the foregoing we hereunto affix our signatures this 6th day of May, A. D. 1889.

GEORGE J. LEARZAF.
FRANK E. SMITH.

In presence of—
S. T. RICHARDS,
M. E. HARRISON.